May 21, 1957
W. C. AGNEW
2,792,793
OVEN
Filed April 6, 1953
6 Sheets-Sheet 1
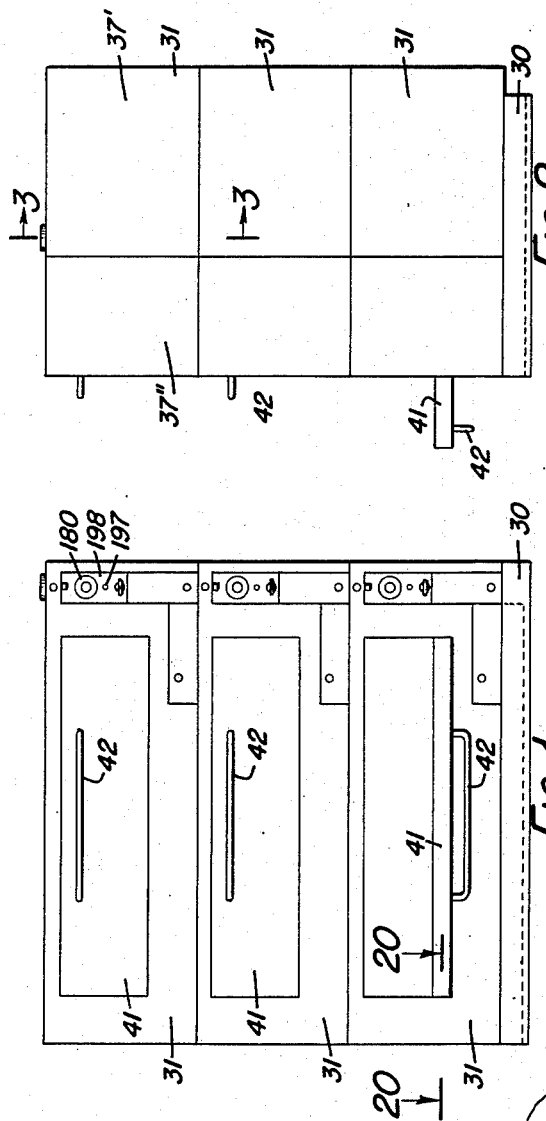
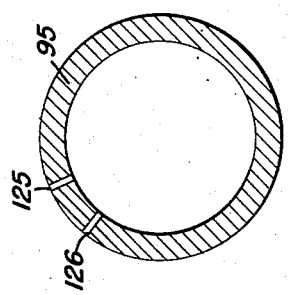
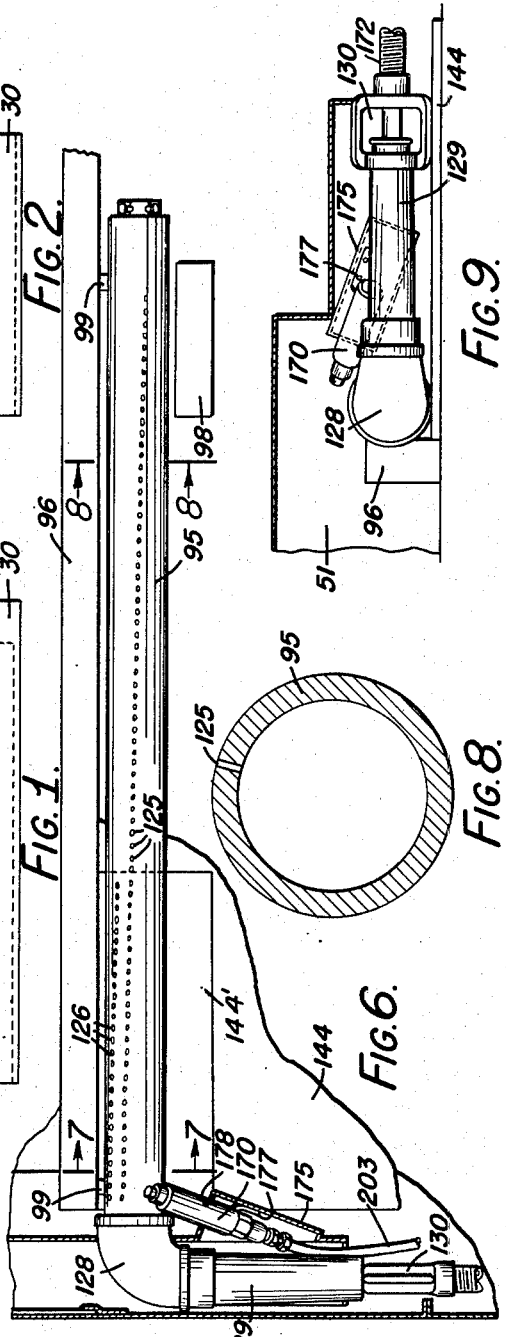
INVENTOR.
WILLIAM C. AGNEW
BY
ATTORNEY

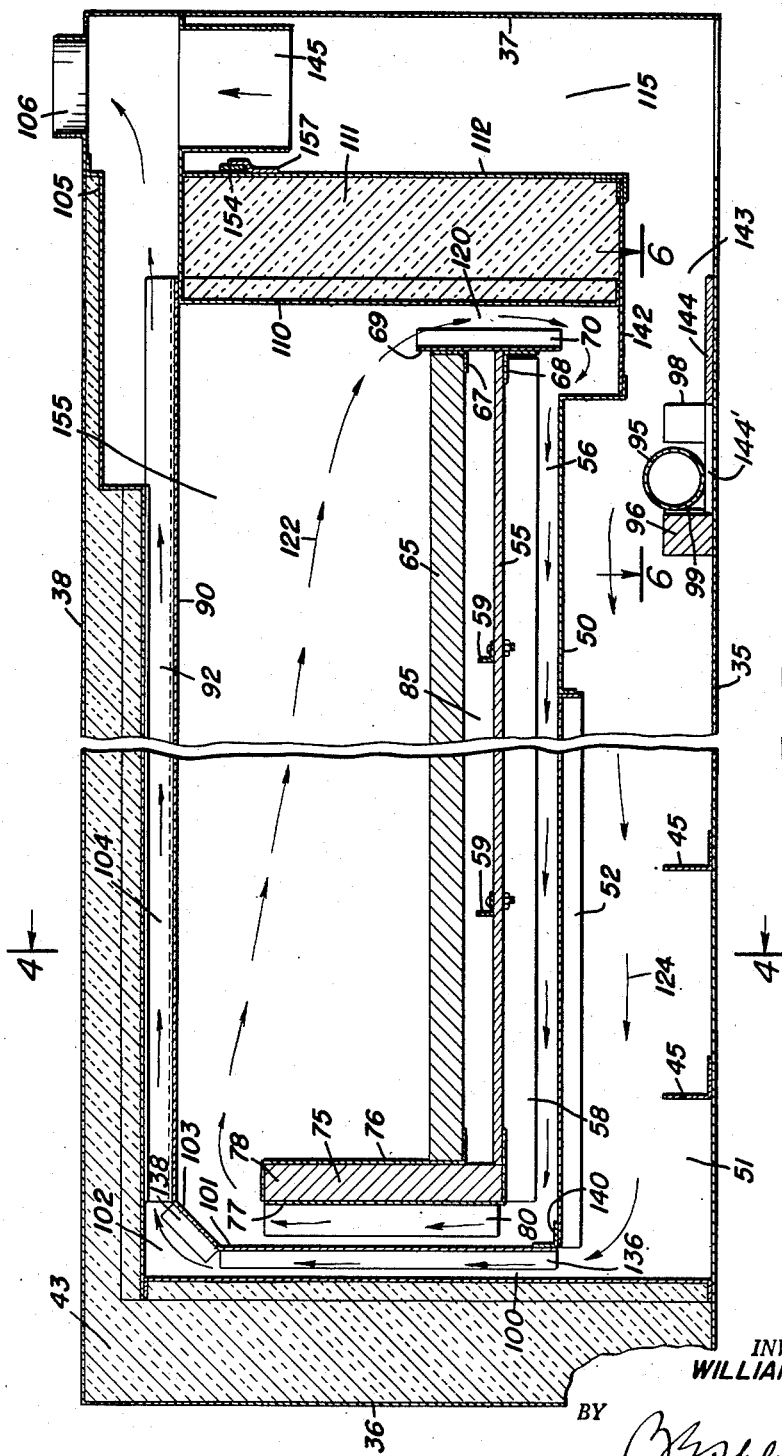

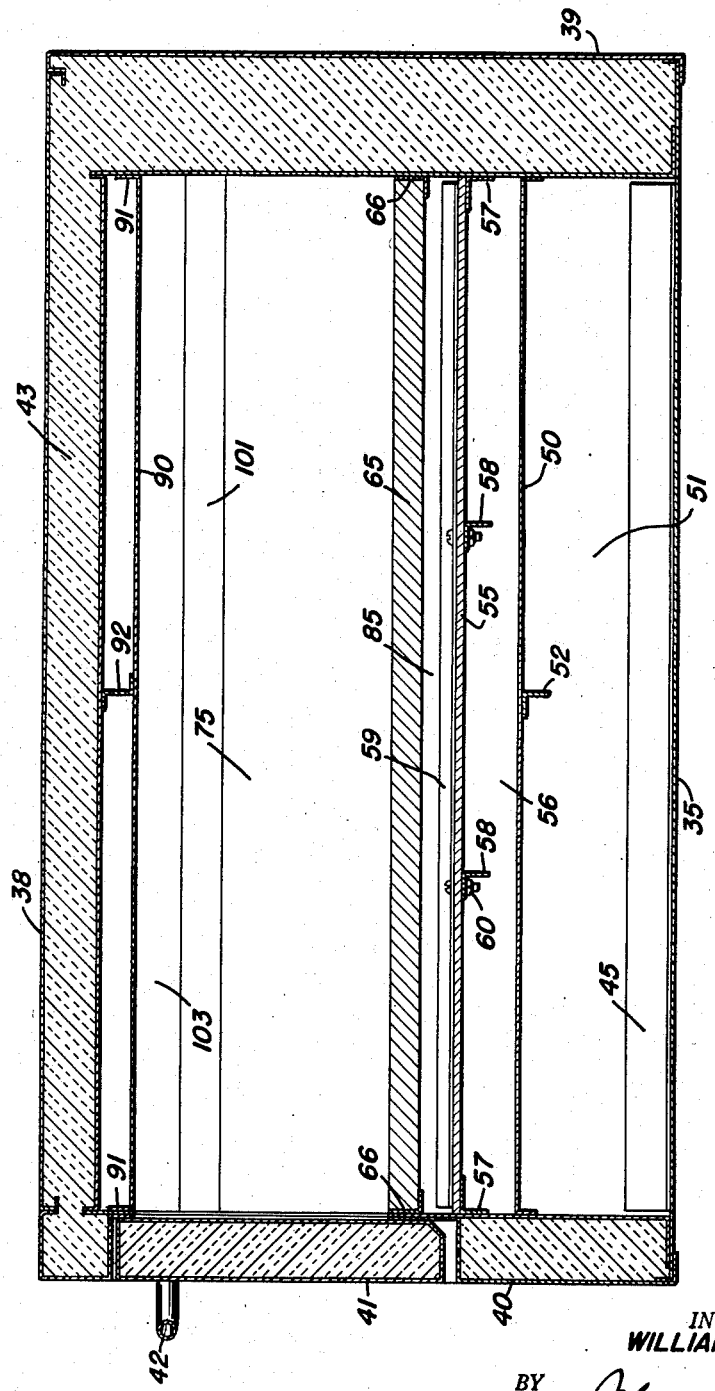

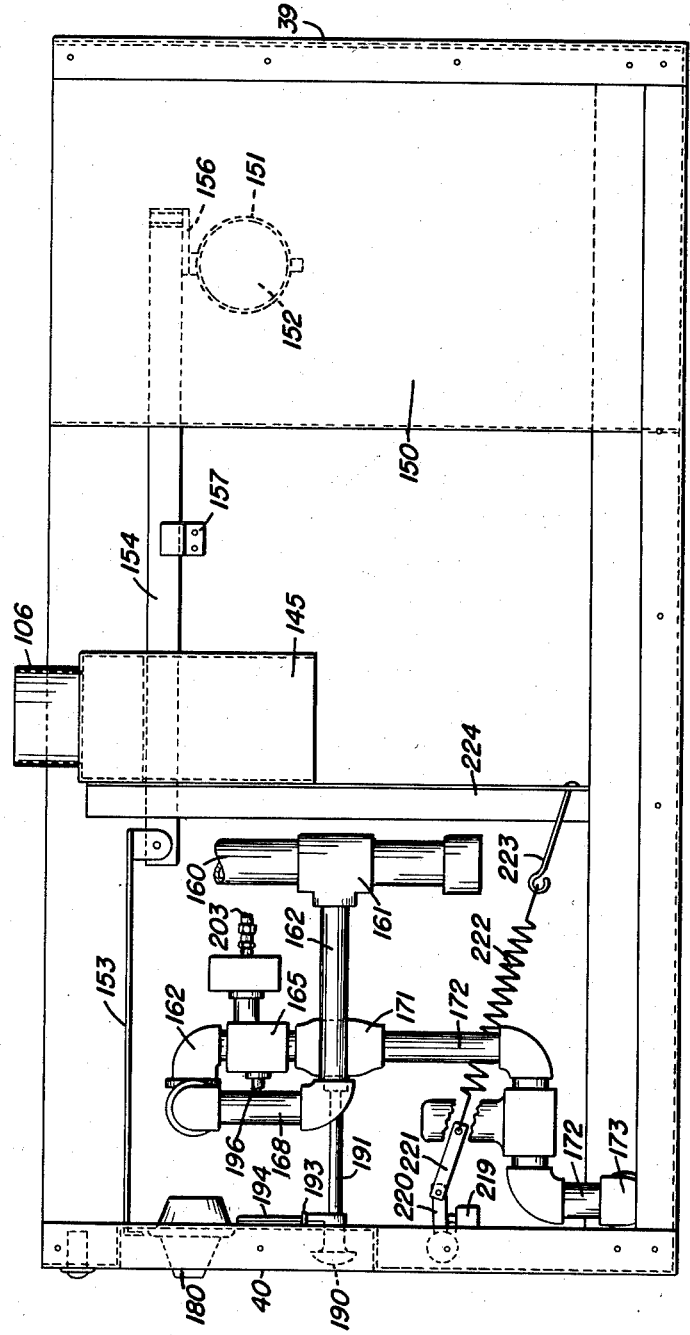

May 21, 1957 W. C. AGNEW 2,792,793
OVEN
Filed April 6, 1953 6 Sheets-Sheet 5
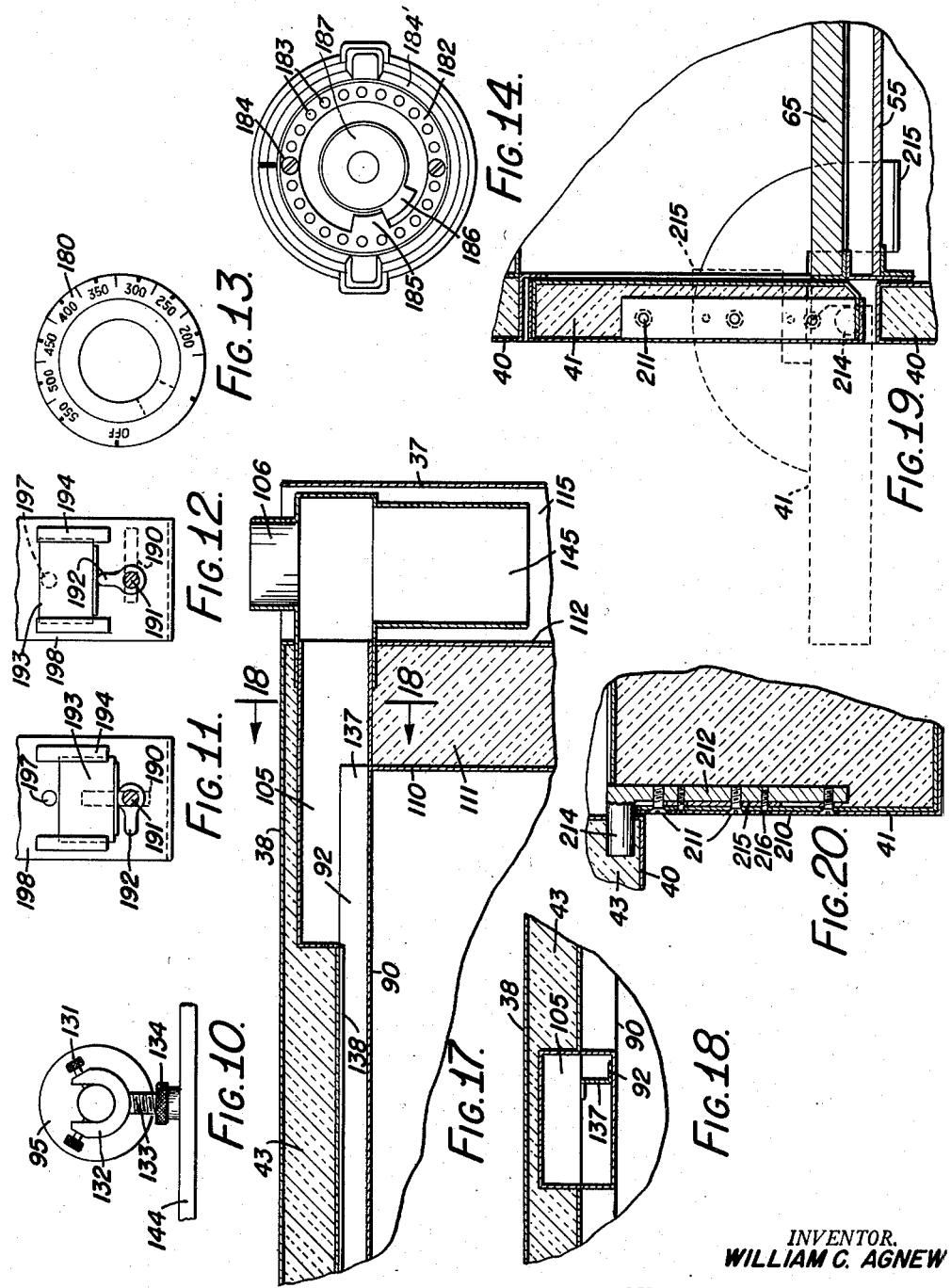
INVENTOR.
WILLIAM C. AGNEW
BY
ATTORNEY May 21, 1957　　　W. C. AGNEW　　　2,792,793
OVEN
Filed April 6, 1953　　　　　　　6 Sheets-Sheet 6
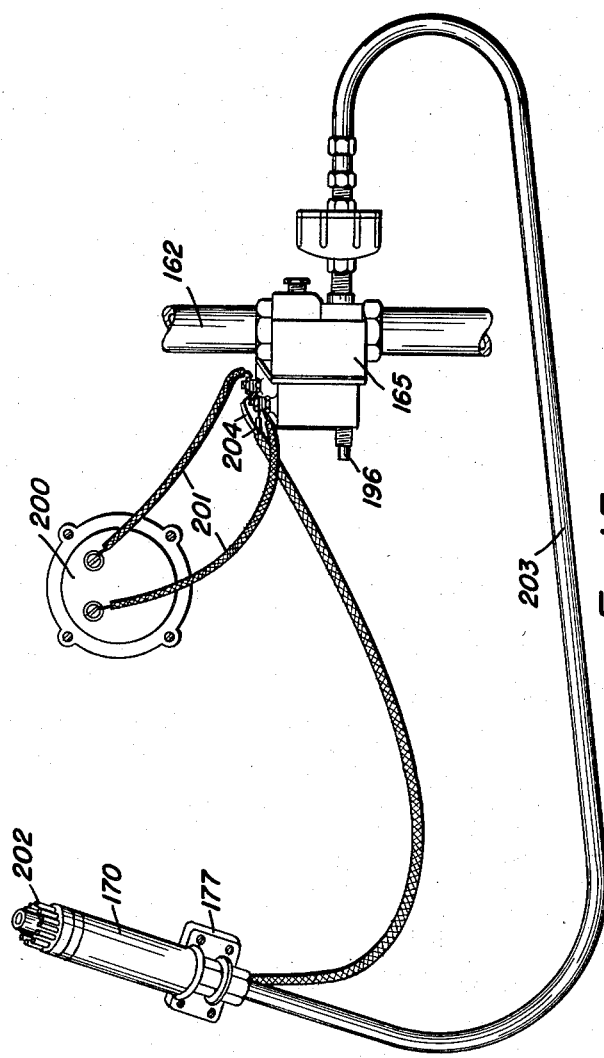
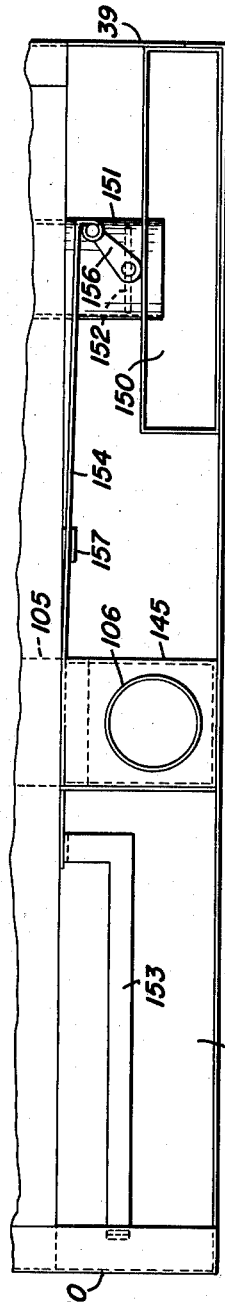
INVENTOR.
WILLIAM C. AGNEW
BY
ATTORNEY

United States Patent Office 2,792,793
Patented May 21, 1957

2,792,793

OVEN

William C. Agnew, Brighton, N. Y.

Application April 6, 1953, Serial No. 347,077

28 Claims. (Cl. 107—63)

The present invention relates to bakers' ovens, and more particularly to that type of gas-heated oven wherein the bottom heat is applied to the materials to be baked through contact with the hearth and the top heat is supplied by downward circulation of convection currents.

In the conventional oven of the character described, difficulty is always experienced in getting uniform heat throughout the whole of the baking chamber. It is impossible to seal the door opening completely and air will seep into the oven around the door, cooling the front of the baking chamber relative to the temperature in other parts of the baking chamber. It is customary, therefore, to mount the gas burner near the front of the combustion chamber of the oven so that the heat of the flame at the front of the oven may counteract the heat loss around the door. Even so, with ovens of the character described as heretofore constructed, there will be variations in temperature in different parts of the baking chamber. These variations in temperature can affect the uniformity of a bake. For certain kinds of baked goods it is necessary to shift the goods around on the hearth of the baking chamber during baking in order to secure uniformity of baking. In addition to the time required for shifting the goods around, there is the further objection that the door of the oven has to be open during shifting which means large waste of heat.

Another drawback of conventional ovens of the character described is that the flue outlet must be at the back of the oven which means that the oven must be spaced from the back wall of the bake-room to avoid fire hazard and to permit proper flue connections. Thus, room space is wasted and pockets are left between the back of the oven and the wall of the bake-room for accumulation of dust and dirt.

One object of the present invention is to provide a baking oven in which substantially uniform temperature will prevail throughout the whole of the oven so that bread, rolls or other goods to be baked will be baked uniformly regardless of whether they are at the back, at the front, at the sides or in the center of the oven.

Another object of the invention is to provide a gas-fired indirect heating oven which will be economical in the amount of gas consumed and which will utilize the flue gases to the maximum degree in heating the oven.

Another object of the invention is to provide a baker's oven that can be installed with its back close to the adjacent wall of the baking room without fire hazard and that can be installed, in multiple oven installations, side by side and tightly together with other similar ovens thereby reducing waste space to a minimum and eliminating dust and dirt pockets between adjacent ovens and between the back of an oven and the adjacent wall.

A further object of the invention is to provide an oven in which the thermostat and other controls are mounted at one side of the oven and insulated from the oven and ventilated so that they may be cool and unaffected by the radiant heat of the oven itself.

Another object of the invention is to provide a baker's oven in which the flue exit is located at one side of the oven in such position as to allow space on the same side at the rear for the baking chamber vent duct and at the front for the necessary controls and accessories incidental to the operation of the burner, and in which the controls and accessories are insulated from the flue and vent pipes but in which the controls and accessories as well as the flue and vent pipes are readily accessible.

Another object of the invention is to provide an oven of the character described which will lend itself to multiple installations in which a plurality of ovens are positioned on top of one another and in which unrestricted vertical movement of air from the bottom to the top of a multiple chamber installation is possible.

Another object of the invention is to provide an oven of the character described in which all the combustion air enters from the front, rear or underneath the oven into a space in which the accessories and controls are mounted and from which air may be drawn into the flue pipe by the suction of the flue gases so that room air will be sucked by the flue gases around the controls and accessories.

Another object of the invention is to provide an oven of the type described in which the pilot for the gas burner is mounted in a pocket that is insulated from the oven so that it will be maintained cool and so that it can readily be serviced.

A further object of the invention is to provide an oven in which the air and gas mixing chamber or inspirator is outside of the combustion chamber itself for safety purposes and to keep it cool and to permit ready removal.

Another object of the invention is to provide an oven having an improved gas type burner and means for adequately aerating the burner along its whole active surface.

Another object of the invention is to provide a burner mounting which is adjustable to control the heat distribution in the baking chamber.

Another object of the invention is to provide an oven in which the ignition means or pilot is not attached directly to the main burner, and in which, therefore, the main burner can be removed without disturbing the pilot and can be reinstalled without changing the relative position of the main burner in respect to the pilot thereby insuring continued safe ignition after removal and replacement of the main burner.

Another object of the invention is to provide an oven of the character described in which the combustion gases are channeled to attain uniformity of heat distribution in the baking chamber and to enhance the uniformity of heat emission through the roof of the combustion chamber and in which the channeling of the combustion gases is continued throughout the flue passage to the flue exit so as to maintain the desired uniformity of heat emission.

Another object of the invention is to provide an oven of the character described having its heating chamber channeled also to help attain uniformity of heat distribution in the baking chamber.

Another object of the invention is to provide an oven in which patty shells or similar goods may be perfectly baked in a dry atmosphere, or hearth goods may be baked with steam, both under ideal conditions of dryness and moisture, respectively, and both at different temperatures.

Other objects of the invention will be apparent hereinafter from the specification and from the recital of the appended claims.

In the drawings:

Fig. 1 is a front view of a triple decker baking unit, each deck or section consisting of an oven built according to one embodiment of this invention, the lowest deck or section being shown with its door open;

Fig. 2 is a side elevation of the triple decker unit looking from the right hand side thereof;

Fig. 3 is a section on an enlarged scale through one of the ovens taken from right to left on the line 3—3 of Fig. 2 and looking in the direction of the arrows;

Fig. 4 is a section through the oven from front to back taken on the line 4—4 of Fig. 3 looking in the direction of the arrows;

Fig. 5 is a side elevation of the oven, looking at it from the right hand side, and with part of the covering panels removed;

Fig. 6 is a section on the line 6—6 of Fig. 3 looking in the direction of the arrows and showing the construction of the burner and the mounting of the pilot valve;

Fig. 7 is a section through the burner on an enlarged scale taken on the line 7—7 of Fig. 6 and looking in the direction of the arrows;

Fig. 8 is a similar section on the line 8—8 of Fig. 6 looking in the direction of the arrows;

Fig. 9 is a section at right angles to Fig. 6 showing the mixing chamber and the pilot valve;

Fig. 10 is a view showing the mounting of the rear end of the burner pipe including the means for effecting rotary adjustment thereof;

Fig. 11 is a detail view showing the safety device which prevents ignition of the pilot when the burner is on, and showing the safety device in the "off" position Fig. 12 is a similar view but showing the safety device in the "one" position;

Fig. 13 is a front elevation of the thermostat setting dial;

Fig. 14 is a section in a plane parallel to the view of Fig. 13 and showing the stop ring for limiting the maximum setting of the thermostat and illustrating how the stop ring operates;

Fig. 15 is a more or less diagrammatic view illustrating the safety mechanism which insures that all gas will be shut off if the thermostat fails to function;

Fig. 16 is a fragmentary horizontal view with a section of the top panel removed and showing the vent-pipe which permits of discharge from the baking chamber of the baked-out moisture where the goods to be baked require a dry atmosphere, the damper controlling the same, the damper manipulating lever, and the flue pipe;

Fig. 17 is a fragmentary vertical section showing the flue pipe or exit and its connections;

Fig. 18 is a fragmentary section on the line 18—18 of Fig. 17 looking in the direction of the arrows;

Fig. 19 is a fragmentary vertical section showing the oven door in full lines in closed position and in dotted lines in open position; and Fig. 20 is a fragmentary horizontal section taken on the line 20—20 of Fig. 1, looking in the direction of the arrows and further showing the mounting of the door.

Referring now to the drawings by numerals of reference, the baking unit shown comprises a base 30 and three ovens 31. These ovens may be identical in construction and only one need be described, therefore, in detail. Each oven has a bottom wall 35 (Fig. 3), side walls 36 and 37, a top wall 38, and back wall 39 (Fig. 4) and a front wall 40. Hingedly mounted to close an opening in the front wall 40 is a door 41 by which access may be had to the oven. A handle 42 is secured to each door 41 for opening or closing the door. The side wall 36, top wall 38, back wall 39, front wall 40, and door 41 are in the form of panels comprising spaced inside and outside metal sheets separated by insulation 43.

The bottom wall 35 is a metal plate strengthened by spaced, parallel angle irons 45 (Figs. 3 and 4) that are welded to its inside face and that extend from front to rear. Mounted above the bottom plate 35 in spaced relation thereto is a metal plate 50 which constitutes the roof of the combustion chamber 51. An angle iron 52, which is welded to the underside of the roof 50 and which extends from left to right of the oven, serves to strengthen this wall and to channelize the combustion chamber as will be described further hereinafter. The roof 50 is welded at opposite ends to the front and rear walls 40 and 39 of the oven.

Mounted above the roof plate 50 in spaced relation thereto is an asbestos millboard sheet 55 which forms with the roof plate the heating chamber 56. The sheet 55, which constitutes the sub-hearth, extends from front to rear of the oven as shown in Fig. 4 and for the major part of the width of the oven as shown in Fig. 3. It is supported at front and back from the front and rear walls 40 and 39, respectively, by angle brackets 57. It has depending angle iron strips 58 bolted to its undersurface to depend into the heating chamber 56 and channelize that chamber for a purpose which will be described in further detail hereinafter. Angle irons 59, which are secured in spaced relation to the upper face of the plate 55 by the same bolts 60 as secure the angle irons 58 to the underface of this plate, serve to strengthen this plate and prevent its buckling.

Mounted above the sub-hearth 55 in spaced relation thereto is the hearth 65. This may be made of a hard ceramic or other suitable material such as "Transite," which is an asbestos fiber-cement material formed under great pressure into dense, monolithic sheets. It is supported from the front and rear walls 40 and 39, respectively, of the oven by angle iron brackets 66 which are welded or otherwise secured to said front and rear walls. The hearth extends from front to rear of the oven as shown in Fig. 4, and for the major part of its width as shown in Fig. 3. The hearth is of sufficient thickness to be self-sustaining.

The sub-hearth 55 and hearth 65 are supported at their right hand sides by angle brackets 67 and 68 which are secured to vertically extending plate 69. Plate 69 extends from front to rear of the oven and may be spot-welded to the inside front and rear walls thereof. Secured to plate 69 at the right hand side thereof by spot-welding or in any other suitable manner are spaced, parallel, vertically extending ribs 70 which register with the ribs formed by the angle irons 58 that are fastened to the underside of sub-hearth 55.

Mounted at the left hand sides of the hearth and sub-hearth is a panel 75 comprising inside and outside metal sheets 76 and 77 and an intermediate insulating board or sheet 78. Spaced, parallel, vertically extending ribs 80 project outwardly from the outside sheet 77 of this panel. These are in registry with the ribs 58 which are secured to the underside of sub-hearth 55. Plate 69 projects downwardly a considerable distance below sub-hearth 55, whereas panel 75 terminates at the bottom of the sub-hearth. Plate 69 projects upwardly only a slight distance above hearth 65, but panel 75 extends a considerable distance thereabove. The purpose of the relative locations of plate 69 and panel 75 will appear clearer hereinafter.

The space 85 between the hearth and the sub-hearth is closed at its ends by plate 69 and plate 75, and is a dead air space aiding in distribution of heat uniformly to the undersurface of the hearth.

Mounted above the hearth 65 and panel 75 is a plate 90 which constitutes the roof of the baking chamber. This plate has upstanding flanges 91 at its front and rear edges which are welded to the insides of the front and rear walls, respectively, of the oven. A Z-iron 92 serves to space and support the plate 90 from the top panel 38 of the oven.

Mounted at one side of the combustion chamber 51 to extend from the front to the rear thereof is the gas burner pipe 95. A "Transite" or other refractory partition wall 96 (Fig. 3) extends along the left hand side of the burner from front to back of the oven; and a short "Transite" or other refractory block 98 (Fig. 6) is positioned at the rear at the right hand side of the burner to form with wall 96 a channel for locating the burner and for aiding in its ready removal from or insertion into the oven. Spacers 99 at front and rear space the burner from wall 96.

The flue gases pass from the combustion chamber 51 into a passage 100 (Fig. 3) between the side panel 36 of the oven and a metal plate 101, thence through the space 102 formed between panels 36 and 38 and a plate 103, and thence through a passage 104 between the panel 38 and plate 90, and thence into the flue 105. Flue 105 has a collar 106 projecting through the top panel 38 of the oven.

Plate 101 is spaced from plate 77 of panel 75 and forms with panel 75 a passageway through which the heated air from heating chamber 56 can travel upwardly alongside and over the top of panel 75 into the baking chamber. Plate 69 at the right hand side of the baking chamber is spaced from the inside wall 110 of an insulating panel 111 whose outside wall 112 is spaced from the right hand outside wall 37 of the oven. The space 115 between the plate 112 and outside wall 37 provides room for the various controls and accessories for the oven as well as for the flue and for the oven vent pipe as well as an entrance for the air of combustion as will be described further hereinafter.

The space 120 between plate 69 and the inside wall 110 of panel 111 affords a passageway for the return of the heated air from the baking chamber to the heating chamber after it has passed over the goods being baked. It will be noted that because the plate 69 at one side of the hearth 65 projects only a slight distance above the hearth, whereas the panel 75 at the opposite side of the hearth projects a considerable distance thereabove the heated air will travel downwardly toward the hearth as it moves from left to right in the oven as indicated by the arrows 122 in Fig. 3. Thus as the air gives up heat to the goods being baked to effect the baking thereof it approaches closer to the baked goods to compensate for this heat loss and tends to produce the uniformity of baking which the oven of this invention aims to achieve.

Since the plate 69 extends below the sub-hearth it acts as a baffle for the returning air; and since the panel 75 terminates even with the bottom of the sub-hearth the desired air travel in the direction of the arrows 122 is obtained.

The burner, its location, and its mounting are some of the most important features of the invention. Heretofore, burners have been positioned to extend cross-wise of ovens and close to the front to compensate for heat losses around the door. In the oven of my invention the burner is positioned at one side of the oven to extend from front to rear. In this way I am able to travel the flue gases under the heating chamber, up one side of the oven through passage 100 (Fig. 3) and over the baking chamber through the passages 102 and 104, and back to the side of the oven from which the flue gases started, before the flue gases enter the flue 105. Thus the maximum efficiency in utilization of the heat produced by the burner is achieved; and the oven is heated more uniformly. The flue gases actually enter the flue at but little, if any, higher temperature than the temperature required for baking. Arrows 124 indicate the path of travel of the flue gases to the flue.

To further insure uniformity of heat over the whole hearth, the burner 95 (Figs. 6, 7 and 8) is of unique construction. It is provided with two rows of holes or ports, the ports of one row being denoted at 125, and the ports of the other row being designated 126. The holes in both rows extend helically part-way only around the cylindrical burner pipe, but the row of holes or ports 126 is much shorter than the row of holes 125, being provided adjacent the front end only of the oven. The presence of the two rows of ports adjacent to the front of the oven provide the extra heat at the front of the oven to compensate for heat losses through the door opening. The row of ports 125 can extend to the rear of the oven but it has been found in practice that this is not necessary because the oven tends to be hottest at its back. Hence, no holes are provided ordinarily adjacent the rear of the burner pipe as shown in Fig. 6.

The helical arrangement of the holes permits of further close control of the application of heat to the oven. The burner pipe 95 is rotatably mounted as customary at its front in the elbow 128 (Figs. 6 and 9) which connects it to the pipe 129 that leads from the mixing chamber 130. At its rear the burner pipe is cradled in a vertically adjustable U-shaped bracket 132 (Fig. 10) which is supported by a threaded steam 133 that is threaded into a lug 134 that is fastened on an insulating plate 144. Plate 144 is mounted on the bottom plate 35 beneath the burner. The rotatable adjustment of the burner 95 permits the flames from the different ports 125 and 126 to be directed at any desired angle to the roof 50 of the combustion chamber 51. The roof will be hottest, of course, over the port which projects its flame directly upwardly. Set screws 131, which thread into opposite arms of the bracket 132, serve to secure the burner in any adjusted angular position. The vertical adjustment of bracket 132 permits of raising the rear end of the burner to position the burner flame closer to the combustion chamber roof at the rear thereof to compensate for the diminution in heat output from front to back, thereby aiding in uniform heat distribution throughout the hearth area.

Since the greater heat is desired at the front of the oven, the rib 52 (Figs. 3 and 4) previously described, which depends from the roof 50 of the combustion chamber, is provided to channelize the heat. Since heat rises this rib tends to keep the heat produced in the front of the combustion chamber by the double row of ports 125 and 126 channelized or separated from the heat produced by the single row of ports 125 in the rest of the combustion chamber. To maintain this channeling of the heat and thereby aid in securing the uniformity of heating desired over the whole of the hearth, channels are similarly provided in the passageways 100, 102 and 104 for the flue gases by providing plates 101 and 103 with ribs 136, 138, respectively (Fig. 3), which register with one another and with rib 52 of roof plate 50 and with Z-iron 92 (Fig. 4), respectively, so as to provide channels through which the flue gases travel to the flue, the hotter gases being channeled and maintained at the front of the oven all around the baking chamber from the combustion chamber clear to the flue.

Because of the greater heat at the front of the oven the flue 105 is set more toward the front of the oven than to the back as clearly shown in Fig. 18, the flue opening being larger at the front of the vertical web 137 of the Z-iron 92 than at the rear of this web. The front part of the upper horizontal flange 138 of the Z-iron is cut away as shown clearly in Figs. 17 and 18 so as not to interfere with the free passage of the flue gases to the flue. However, there is a collar 145 (Fig. 17) projecting downwardly from the flue which opens at its upper end into the flue and at its lower end into the air space 115 between panel 111 and the right hand wall 37 of the oven. Air is drawn from space 115 into collar 145 and into the flue by the suction of the flue gases rising in the flue. This satisfies the chimney draft but lower the velocity of the escaping flue gases. Therefore, collar 145 acts as a draft brake reducing the velocity of travel of the flue gases up the chimney and further insuring maximum usage of the heat in the flue gases before they are exhausted to the chimney. Thus, efficiency in operation is attained.

For a similar reason to the reason for channeling the flue gases on their passage around the oven to the flue, ribs 58, 80 and 70 (Fig. 3) are provided underneath sub-hearth 55, on the outside of panel 75 and on the outside of plate 69, respectively. These ribs channel the heat and keep the hottest air traveling in a band around the front of the baking chamber. There are preferably more ribs 58, 80 and 70 provided, however, than ribs 52, 136, 138 and 92, again in the interest of equalizing the application of heat to the baking chamber. The number of ribs in the heating chamber and communicating hot air passages and in the combustion chamber and communicating flue gas passages can be varied as desired, however, to meet conditions. The structure illustrated is exemplary only.

Plates 101, 103, 90 and 110 enclose with panel 75 and plate 69 the baking chamber. Plate 101 is welded or otherwise fastened at front and rear to the front and rear panels of the oven and at its base it is secured by an angle iron 140 (Fig. 3) to the roof 50 of the combustion chamber. Plate 103 is spot welded to plates 90 and 101 and to the front and rear panels of the oven. Plate 90 is welded to panel 111 and panel 111 is secured to a plate 142 that forms the upper wall of a passageway 143 for the air required for combustion. The bottom wall 35 of the oven and the foundation plate 144, on which the burner 95 rests, form the bottom wall of this passageway. Plate 144 can be made of asbestos mill board. Plate 144 is cut away at its front, as denoted at 144' in Fig. 6 to permit air to flow upwardly at both sides of burner pipe 95 at the front to insure proper combustion of the gas flowing from ports 126 and from front ports 125.

The space 115 of each oven is closed at its outside by two removable plates 37' and 37" (Figs. 2 and 5) which together constitute the right hand side wall of the panel. Between plate 37' and panel 111 there is mounted the vent pipe 150 (Figs. 5 and 16) which is connected by duct 151 with the baking chamber 155 (Fig. 3). Duct 151 extends through panel 111. Duct 151 and vent pipe 150 are provided to allow escape of steam from the oven where the character of the goods to be baked makes that desirable. A damper 152 is pivotally mounted in duct 151 to open or close the escape passage therethrough. This damper is controlled by a lever 153 which is manipulable from the front of the oven and which is connected to a strap 154 that is pivotally connected at its rear end to one end of an arm 156 that is fastened at its opposite end to the pintle for damper 152. Strap 154 slides in a keeper 157 that is riveted to the outside of panel 111.

The front portion of the space 115 contains the various controls and accessories. The gas is supplied to the oven through a pipe 160 (Fig. 5) that is connected by a T 161, and suitable piping and connections 162 with a valve 165 (Fig. 15) that may be of conventional construction which is the safety shut-off valve for the pilot burner 170 (Figs. 6, 9 and 15). Valve 165 is also connected with the shut-off cock or valve 171 (Fig. 5) for the burner 95. This cock or valve 171 may be also of conventional construction. It is connected with mixing chamber 130 (Fig. 9) for burner 95 by suitable piping and connections 172.

The pilot burner 170 is mounted in a bracket 175 (Figs. 6 and 9) so that it is in operative relation to the burner pipe 95 but it is mounted separate from burner pipe 95 so that burner pipe 95 can be removed for cleaning, repair, or replacement without disturbing the pilot burner. The union 173 (Fig. 5) can be disconnected; and then the burner-inspirator assembly 95—128—129—130 (Figs. 6 and 9) can be slid forwardly to remove it from the oven without disturbing pilot 170. When the burner pipe 95 is replaced the pilot burner 170 will be in proper position to cooperate with it.

After the burner 95 has been removed, however, the pilot burner 170 can be removed also, if desired. It is held in bracket 175 by screws which pass through the bracket 177 that is attached to the pilot. The pilot can be slid axially out of opening 178 in bracket 175.

The temperature of baking is controlled by a conventional thermostat which can be adjusted for the temperature desired by a rotary dial 180 (Fig. 13) which is mounted in space 115 to be accessible from the front of the oven as shown in Fig. 5. To insure against a baker setting the temperature too high a stop ring 182 is provided as shown in Fig. 14. This ring has a plurality of equi-spaced holes 183 in it which are adapted to receive screws 184 by which the ring may be secured adjustably in any adjusted position to the fixed bezel 184' that surrounds dial 180 and that is secured to the front wall of the oven. Stop ring 182 has an internal projecting lug 185 that is adapted to engage a lug 186 on the rotary part 187 that is journaled in the front wall 40 and to which dial 180 is secured, thereby to stop the rotary adjustment of the dial. Suppose the foreman of the bakery determines that 450° F. is the highest heat at which he wants an oven run, then he sets ring 182 to stop thermostat adjusting dial 180 when it registers 450°. Thus a baker is prevented from adjusting the oven to operate at a higher temperature than 450° or whatever maximum operating temperature is selected by the foreman.

If the oven has been shut down for any reason and it is desired to start it up again, the pilot burner 170 should be ignited before the main burner 95 is turned on; otherwise there is likely to be an explosion. To insure that the main burner is off before igniting the pilot burner a safety device is provided as shown in Figs. 11 and 12. 190 (Fig. 5) denotes the handle or knob for operating the cock or valve of the main burner. It is secured to the rotary valve shaft 191 that operates main burner valve 171. It has a lug 192 secured to it that engages a slide 193 that slides in guideways 194 provided on the rear of front panel 40 of the oven. 196 is the button that must be pushed to open the gas feed line from conventional valve 165 (Fig. 15) to the pilot burner. This button is back of front panel 40 and a screw driver or other implement must be inserted through an opening 197 (Fig. 1) in a front cover plate 198 in order to operate the button. When knob 190 (Figs. 5, 11 and 12) is in position where the cock or valve of the main burner is turned on, slide 193 is raised as shown in Fig. 13 preventing access to button 196 (Fig. 5) through hole 197. Hence if the main burner valve is on the pilot button cannot be operated. The arm 192 must be turned to the off position of the main burner to lower slide 193 and allow access to pilot button 196. Thus assurance is had that the gas will not be flowing to the main burner when the pilot burner is ignited.

As an additional safety feature a temperature limit switch is provided as shown in Fig. 15. The limit switch comprises a conventional normally-open bimetallic temperature switch 200 preset to close when the inside temperature in the oven exceeds a safe maximum temperature. This switch is mounted inside the baking chamber 155 or in some other location where it will reflect the inside baking temperature of the oven. The pilot shut-off valve 165 is of conventional construction. It is connected to the pilot burner by a flexible gas-supply tube 203. It is adapted to be operated by an electromagnet, not shown, in a conventional manner. The switch 200 is connected to this electromagnet by lines 201. This electromagnet is also connected by lines 204 to the thermocouples 202 of the pilot burner so that it is maintained in open position by the current generated in these thermocouples by the heat of the pilot burner. When the limit switch 200 closes, the solenoid is shorted, and the valve 165 closes shutting off all gas to the main burner 95 and pilot burner 170.

The right hand side of the bottom wall 35 is cut away at its front as shown in Fig. 3 opposite space 115 so that air can enter this space from the back to supply the flue-brake 145 (Figs. 5 and 17) and to cool the various instruments and controls as well as to supply air to the main burner and pilot burner.

The door 41 of each oven comprises an insulated panel. The door panel is fastened along each of its opposite side edges by a plate 210 and by screws 211 to a supporting member 212, as shown in the case of the left hand edge in Fig. 20. Each supporting member 212 has a pintle 214 integral with it that is journaled in a suitable bearing formed in the front panel 40 of the oven. The door is hinged on its two pintles.

A stop 215 (Fig. 19) may be secured to the door to limit its outward swinging movement to horizontal position as shown in dotted lines in Fig. 19. Means may also be secured to the door to operate a light switch 219 (Fig. 5) to illuminate the baking chamber when the door is open. This means may comprise an arm 220 (Fig. 5) pivotally mounted on the door and connected by a link 221 with one end of a coil spring 222. The other end of this coil spring is connected to a hook 223 that is secured in an upright 224 which serves as a vertical partition between the burner piping, controls and accessories, and the flue and vent ducts. Stop 215 is secured to the door by screws 216 (Fig. 20).

The door can readily be removed from the oven by unthreading screws 216 to detach it from stop plate 215 and by unthreading screws 211 to detach it from the supporting members 212, and by then sliding it out of the supporting members. The supporting members can then be removed by sliding them out of their bearings. By reversing these steps the door can be mounted again in the oven.

The oven described has many outstanding advantages, the principal one of which is the uniformity of temperature throughout the baking chamber which it permits of achieving. Actual tests have shown that there is hardly any measurable variation in temperature between the back, the front, the two sides, or the center of the hearth. This permits of baking all the goods of a batch all alike. This uniformity of temperature is achieved through the combination of various features. By locating the burner at one side of the oven the flue gases can be carried below the conductive roof of the combustion chamber through the vertical passage at the left hand side of the oven, and over the top of the baking chamber before entering the flue. Thus, heat is transmitted to the heating chamber and to the baking chamber not only from the conductive roof of the combustion chamber but also through the inside and bottom conductive walls of the vertical side and horizontal top flue-gas passages. This not only insures maximum efficiency of fuel utilization but aids in achieving the uniformity of temperature desired.

Another factor in achieving this uniformity of temperature is the construction of the burner itself with its double row of holes at the front, its variously inclined, helically arranged holes, and its rotatable adjustability. Still another factor is the dead air chamber between the sub-hearth and the hearth that evens out the heat on the bottom of the hearth. A still further factor is the construction of the heating chamber and the communicating vertical side passages which permit supply of top heat to the goods being baked through downward circulation of current, and which insure continuous circulation of the air under, over, and around the baking chamber. A still further factor is the channeling of the heated air and of the flue gases to maintain constant heating conditions at the bottom, top and all around the baking chamber.

The oven of this invention may be installed with its back adjacent the building wall because of absence of back flue connections. Ovens may also be installed side by side because the air required for combustion and for cooling the controls comes through openings both in the back and in the bottom of the oven.

While the invention has been described, then, in connection with a particular embodiment thereof, it will be understood that it is capable of various modifications and uses; and this application is intended to cover any variations, uses or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A baking oven comprising a baking chamber, a combustion chamber below said baking chamber, a gas burner disposed at one side laterally of said combustion chamber and extending in a front to rear direction in said oven, and a flue passage formed by walls leading upwardly from said combustion chamber at the opposite side laterally of said combustion chamber from said burner and alongside said baking chamber and over said baking chamber to a flue outlet disposed at the same side of said oven as said burner, the walls of said flue passage alongside and above said baking chamber being conductive whereby heat is transmitted from the flue gases to the air in said baking chamber.

2. A baking oven comprising a baking chamber, a combustion chamber below said baking chamber, a gas burner disposed at one side laterally of said combustion chamber and extending in a front to rear direction in said oven, and a flue passage formed by walls leading upwardly from said combustion chamber at the opposite side laterally of said combustion chamber from said burner and alongside said baking chamber and over said baking chamber to a flue outlet disposed at the same side of said oven as said burner, the walls of said flue passage alongside and above said baking chamber being conductive whereby heat is transmitted from the flue gases to the air in said baking chamber, and means for channeling the flow of the flue gases as they flow through said passage, thereby restricting forward and backward movement of the gases in said passage.

3. A baking oven comprising a baking chamber, a heating chamber below said baking chamber, a combustion chamber below said heating chamber and having a top wall, a gas burner mounted in said combustion chamber at one lateral side thereof and extending in a front to rear direction in said oven, a duct formed by bounding walls for conducting the flue gases from said burner upwardly from said combustion chamber at the opposite lateral side of said oven from said burner, to a point above said baking chamber, a duct formed by bounding walls for conducting the flue gases thence over the top of said baking chamber and to a flue outlet disposed at the same side of said oven as said burner, a passageway disposed between the first-named duct and said baking chamber to conduct hot air from said heating chamber upwardly along one lateral side of said baking chamber to the top thereof, and a passageway along the opposite lateral side of said baking chamber for conducting air from said baking chamber back to said heating chamber, the top wall of said combustion chamber, and those walls of said ducts which are alongside said first-named passageway and over said baking chamber, respectively, being conductive whereby heat is transmitted from said combustion chamber to said heating chamber and from said flue gases to the air in said first-named passageway and in said baking chamber, respectively, and both said passageways being open at their upper ends into said baking chamber and at their lower ends into said heating chamber, the first-named passageway projecting a greater distance above the floor of said baking chamber than said second-named passageway and the second-named passageway projecting below said baking chamber, whereby the heated air will flow continuously from said heating chamber up the first-named passageway and downwardly through the baking chamber to the second-named passageway and thence back to said heating chamber.

4. A baking oven comprising a baking chamber, a heating chamber beneath said baking chamber, a combustion chamber beneath said heating chamber and having a conductive roof which forms the bottom wall of said heating chamber, means for causing hot air from said heating chamber to travel up along one lateral side of baking chamber and thence downwardly to the other lateral side of said baking chamber and back to said heating chamber, a gas burner in said combustion chamber at one lateral side thereof and extending in said oven in a front to rear direction, a flue passage leading upwardly from said combustion chamber at the opposite lateral side thereof from said gas burner and having a conductive wall spaced from said the first-named lateral side of said baking chamber for a portion of its height at least and forming with said first-named lateral side of said baking chamber a passage for the hot air to travel upwardly from said heating chamber along said first-named lateral side of said baking chamber, a flue passage leading from the first-named flue passage over said baking chamber to a flue outlet and having a conductive wall forming the top of said baking chamber, and means for adjusting the rear end of said burner up and down relative to the roof of said combustion chamber to vary from front to rear the effective distance between said burner and the roof of said combustion chamber.

5. A baking oven comprising a baking chamber having a bottom, a front wall, a rear wall, and two lateral side walls, a front door in said front wall for access to said baking chamber, a heating chamber beneath said baking chamber, means for causing hot air to travel from said heating chamber upwardly along one lateral side wall of said baking chamber to the top thereof and downwardly through said baking chamber to the other lateral side wall thereof, and thence back to said heating chamber, and means including heating means which extend beneath said heating chamber and from front to rear relative to said baking chamber for applying more heat to said heating chamber at its front than at its rear.

6. A baking oven comprising a baking chamber having a bottom, a front wall, a rear wall, and two lateral side walls, and a front door in said front wall for access to said baking chamber, a heating chamber beneath said baking chamber, means for causing hot air to travel from said heating chamber upwardly along one lateral side wall of said baking chamber to the top thereof and downwardly through said baking chamber to the other lateral side wall thereof, and thence back to said heating chamber, a combustion chamber beneath said heating chamber and having a conductive roof which forms the floor of said heating chamber, a gas burner mounted in said combustion chamber to extend in a front to rear direction relative to said baking chamber, and means for adjusting said burner at one end toward and from said roof whereby to vary the distance between said burner and said roof from front to rear of said roof.

7. A baking oven comprising a baking chamber having a bottom, a front wall, a rear wall, and two lateral side walls, and a front door in said front wall for access to said baking chamber, a heating chamber beneath said baking chamber, means for causing hot air to travel from said heating chamber upwardly along one lateral side wall of said baking chamber to the top thereof and downwardly through said baking chamber to the other lateral side wall thereof, and thence back to said heating chamber, a combustion chamber beneath said heating chamber and having a conductive roof which forms the floor of said heating chamber, and a gas burner mounted in said combustion chamber to extend in a front to rear direction relative to said baking chamber and having a plurality of spaced ports arranged in a helix lengthwise.

8. A baking oven comprising a baking chamber, a heating chamber beneath said baking chamber, means for causing hot air to travel from said heating chamber upwardly along one side of said baking chamber to the top thereof and downwardly through said baking chamber to the other side thereof, and thence back to said heating chamber, a combustion chamber beneath said heating chamber and having a conductive roof which forms the floor of said heating chamber, and a gas burner mounted in said combustion chamber to extend in a front to rear direction and having a plurality of spaced ports arranged in a helix lengthwise, said burner being rotatably adjustable about its axis to vary the distance between different ports and said roof.

9. A baking oven comprising a baking chamber having a bottom, a front wall, a rear wall, and two side walls, and a front door in said front wall for access to said baking chamber, a heating chamber beneath said baking chamber, means for causing hot air to travel from said heating chamber upwardly along one side wall of said baking chamber to the top thereof and downwardly through said baking chamber to the other side wall thereof, and thence back to said heating chamber, a combustion chamber beneath said heating chamber and having a conductive roof which forms the floor of said heating chamber, and a gas burner mounted in said combustion chamber to extend in a front to rear direction relative to said baking chamber and having a plurality of spaced ports arranged in two longitudinal rows, both of which begin at the front end of the burner but one of which extends rearwardly a greater distance than the other.

10. A baking oven comprising a baking chamber, a heating chamber beneath said baking chamber, means for causing hot air to travel from said heating chamber upwardly along one side of said baking chamber to the top thereof and downwardly through said baking chamber to the other side thereof, and thence back to said heating chamber, a combustion chamber beneath said heating chamber and having a conductive roof which forms the floor of said heating chamber, and a gas burner mounted in said combustion chamber to extend in a front to rear direction and having a plurality of spaced ports arranged in two longitudinal rows, both of which begin at the front end of the burner but one of which extends rearwardly a greater distance than the other, both of said rows being disposed helically about the axis of said burner, and said burner being rotatable on its axis to vary the distance between different ports and said roor.

11. A baking oven comprising a baking chamber, a heating chamber beneath said baking chamber, means for conducting hot air from said heating chamber upwardly along one lateral side of said baking chamber to the top thereof, means for conducting air downwardly along the other lateral side thereof back to said heating chamber, said two means being so disposed relative to one another that the heated air will travel downwardly in said baking chamber from the first-named means to the second-named means, a combustion chamber beneath said heating chamber and having a conductive roof which forms the floor of said heating chamber, a gas burner mounted in said combustion chamber at one lateral side thereof to extend in a front to rear direction, means for conducting flue gases from the opposite lateral side of said combustion chamber upwardly in conductive relation with the hot air flowing upwardly from said heating chamber and over said baking chamber in conductive relation with the air in said baking chamber and to a flue outlet at the same side of said oven as said burner, and means for varying the effective distance from front to rear between said burner and said roof.

12. A baking oven comprising a baking chamber, a heating chamber beneath said baking chamber, means for conducting hot air from said heating chamber upwardly along one side of said baking chamber to the top thereof, means for conducting air downwardly along the other side thereof back to said heating chamber, said two means being so disposed relative to one another that the heated air will travel downwardly in said baking chamber from the first-named means to the second-named means, a combustion chamber beneath said heating chamber and having a conductive roof which forms the floor of said heating chamber, a gas burner mounted in said combustion chamber at one side thereof to extend in a front to rear direction, and means for conducting flue gases from the opposite side of said combustion chamber upwardly in conductive relation with the hot air flowing upwardly from said heating chamber and over said baking chamber in conductive relation with the air in said baking chamber and to a flue outlet at the same side of said oven as said burner, said burner having a greater number of ports at its front end than adjacent its rear end, whereby to apply greater heat to the front end of said roof.

13. A baking oven comprising a baking chamber, a heating chamber beneath said baking chamber, means for conducting hot air from said heating chamber upwardly along one side of said baking chamber to the top thereof, means for conducting air downwardly along the other side thereof back to said heating chamber, said two means being so disposed relative to one another that the heated air will travel downwardly in said baking chamber from the first-named means to the second-named means, a combustion chamber beneath said heating chamber and having a conductive roof which forms the floor of said heating chamber, a gas burner mounted in said combustion chamber at one side thereof to extend in a front to rear direction, means for conducting flue gases from the opposite side of said combustion chamber upwardly in conductive relation with the hot air flowing upwardly from said heating chamber and over said baking chamber in conductive relation with the air in said baking chamber and to a flue outlet at the same side of said oven as said burner, and means for adjusting said burner at one end toward and from said roof whereby to vary the distance between said burner and said roof from front to rear of said roof.

14. A baking oven comprising a baking chamber, a heating chamber beneath said baking chamber, means for conducting hot air from said heating chamber upwardly along one lateral side of said baking chamber to the top thereof, means for conducting air downwardly along the other lateral side thereof back to said heating chamber, said two means being so disposed relative to one another that the heated air will travel downwardly in said baking chamber from the first-named means to the second-named means, a combustion chamber beneath said heating chamber and having a conductive roof which forms the floor of said heating chamber, a gas burner mounted in said combustion chamber at one lateral side thereof to extend in a front to rear direction, and means for conducting flue gases from the opposite lateral side of said combustion chamber upwardly in conductive relation with the hot air flowing upwardly from said heating chamber and over said baking chamber in conductive relation with the air in said baking chamber and to a flue outlet at the same side of said oven as said burner, said burner having a plurality of spaced ports arranged in a helix lengthwise.

15. A baking oven comprising a baking chamber, a heating chamber beneath said baking chamber, means for conducting hot air from said heating chamber upwardly along one side of said baking chamber to the top thereof, means for conducting air downwardly along the other side thereof back to said heating chamber, said two means being so disposed relative to one another that the heated air will travel downwardly in said baking chamber from the first-named means to the second-named means, a combustion chamber beneath said heating chamber and having a conductive roof which forms the floor of said heating chamber, a gas burner mounted in said combustion chamber at one side thereof to extend in a front to rear direction, and means for conducting flue gases from the opposite side of said combustion chamber upwardly in conductive relation with the hot air flowing upwardly from said heating chamber and over said baking chamber in conductive relation with the air in said baking chamber and to a flue outlet at the same side of said oven as said burner, said burner having a plurality of spaced ports arranged in a helix lengthwise, and said burner being rotatably adjustable about its axis to vary the distance between the different ports and said roof.

16. A baking oven comprising a baking chamber, a heating chamber beneath said baking chamber, means for conducting hot air from said heating chamber upwardly along one side of said baking chamber to the top thereof, means for conducting air downwardly along the other side thereof back to said heating chamber, said two means being so disposed relative to one another that the heated air will travel downwardly in said baking chamber from the first-named means to the second-named means, a combustion chamber beneath said heating chamber and having a conductive roof which forms the floor of said heating chamber, a gas burner mounted in said combustion chamber at one side thereof to extend in a front to rear direction, and means for conducting flue gases from the opposite side of said combustion chamber upwardly in conductive relation with the hot air flowing upwardly from said heating chamber and over said baking chamber in conductive relation with the air in said baking chamber and to a flue outlet at the same side of said oven as said burner, said burner having a plurality of spaced ports arranged in two longitudinal rows, both of which begin at the front end of the burner but one of which extends rearwardly a greater distance than the other.

17. A baking oven comprising a baking chamber, a heating chamber beneath said baking chamber, means for conducting hot air from said heating chamber upwardly along one side of said baking chamber to the top thereof, means for conducting air downwardly along the other side thereof back to said heating chamber, said two means being so disposed relative to one another that the heated air will travel downwardly in said baking chamber from the first-named means to the second-named means, a combustion chamber beneath said heating chamber and having a conductive roof which forms the floor of said heating chamber, a gas burner mounted in said combustion chamber at one side thereof to extend in a front to rear direction, and means for conducting flue gases from the opposite side of said combustion chamber upwardly in conductive relation with the hot air flowing upwardly from said heating chamber and over said baking chamber in conductive relation with the air in said baking chamber and to a flue outlet at the same side of said oven as said burner, said burner having a plurality of spaced ports arranged in two longitudinal rows, both of which begin at the front end of the burner but one of which extends rearwardly a greater distance than the other, both of said rows being disposed helically about the axis of said burner, and said burner being rotatable on its axis to vary the distance between different ports and said roof.

18. A baking oven comprising a baking chamber, a heating chamber beneath said baking chamber, means for conducting hot air from said heating chamber upwarly along one lateral side of said baking chamber to the top thereof, means for conducting air downwardly along the other lateral side of said baking chamber back to said heating chamber, said two means being so disposed relative to one another that the heated air will travel downwardly in said baking chamber from the first-named means to the second-named means, a combustion chamber beneath said heating chamber and having a conductive roof which forms the floor of said heating chamber, a gas burner mounted in said combustion chamber at one lateral side thereof to extend in a front to rear direction, and means for conducting flue gases from the opposite lateral side of said combustion chamber upwardly in conductive relation with the hot air flowing upwardly from said heating chamber and over said baking chamber in conductive relation with the air in said baking chamber and to a flue outlet at the same lateral side of said oven as said burner, means for varying the effective distance from front to rear between said burner and said roof, and means for channeling the flue gases to deter their movement from front to rear as they travel from said combustion chamber to said flue outlet.

19. A baking oven comprising a baking chamber, a heating chamber beneath said baking chamber, means for conducting hot air from said heating chamber upwardly along one lateral side of said baking chamber to the top thereof, means for conducting air downwardly along the other lateral side of said baking chamber back to said heating chamber, said two means being so disposed relative to one another that the heated air will travel downwardly in said baking chamber from the first-named means to the second-named means, a combustion chamber beneath said heating chamber and having a conductive roof which forms the floor of said heating chamber, a gas burner mounted in said combustion chamber at one lateral side thereof to extend in a front to rear direction, and means for conducting flue gases from the opposite lateral side of said combustion chamber upwardly in conductive relation with the hot air flowing upwardly from said heating chamber and over said baking chamber in conductive relation with the air in said baking chamber and to a flue outlet at the same lateral side of said oven as said burner, means for varying the effective distance from front to rear between said burner and said roof, and means for channeling the hot air as it travels in said heating chamber and along opposite sides of said baking chamber to deter movement thereof from front to rear.

20. A baking oven comprising a baking chamber, a heating chamber beneath said baking chamber, means for conducting hot air from said heating chamber upwardly along one lateral side of said baking chamber to the top thereof, means for conducting air downwardly along the other lateral side of said baking chamber back to said heating chamber, said two means being so disposed relative to one another that the heated air will travel downwardly in said baking chamber from the first-named means to the second-named means, a combustion chamber beneath said heating chamber and having a conductive roof which forms the floor of said heating chamber, a gas burner mounted in said combustion chamber at one lateral side thereof to extend in a front to rear direction, means for conducting flue gases from the opposite lateral side of said combustion chamber upwardly in conductive relation with the hot air flowing upwardly from said heating chamber and over said baking chamber in conductive relation with the air in said baking chamber and to a flue outlet at the same lateral side of said oven as said burner, means for varying the effective distance from front to rear between said burner and said roof, means for channeling the flue gases to deter their movement from front to rear as they travel from said combustion chamber to said flue outlet, and means for channeling the hot air as it travels in said heating chamber and along opposite sides of said baking chamber to deter movement thereof from front to rear.

21. A baking oven comprising a baking chamber, a heating chamber beneath said baking chamber, a dead air chamber interposed between said baking chamber and said heating chamber, means for conducting hot air from said heating chamber upwardly along one side of said baking chamber to the top thereof, means for conducting air from said baking chamber downwardly along the opposite side thereof back to said heating chamber, said two means being so disposed to one another that the air will travel downwardly in said baking chamber from the first-named means to the second-named means, a combustion chamber beneath said heating chamber and having a conductive roof which forms the floor of said heating chamber, a gas burner mounted in said combustion chamber at one side thereof to extend in a front to rear direction, means for conducting flue gases from the opposite side of said combustion chamber upwardly in conductive relation with the hot air flowing upwardly from said heating chamber and over said baking chamber in conductive relation with the air in said baking chamber and to a flue outlet at the same side of said oven as said burner, said burner having a plurality of spaced ports arranged in two longitudinal rows, both of which begin at the front end of the burner but one of which extends rearwardly a greater distance than the other, means for adjusting said burner to vary its effective distance from said roof from front to rear, and means for channeling the flue gases to deter their movement from front to rear as they travel from said combustion chamber to said flue outlet.

22. A baking oven comprising a baking chamber, a heating chamber beneath said baking chamber, a dead air chamber interposed between said baking chamber and said heating chamber, means for conducting hot air from said heating chamber upwardly along one side of said baking chamber to the top thereof, means for conducting air from said baking chamber downwardly along the opposite side thereof back to said heating chamber, said two means being so disposed to one another that the air will travel downwardly in said baking chamber from the first-named means to the second-named means, a combustion chamber beneath said heating chamber and having a conductive roof which forms the floor of said heating chamber, a gas burner mounted in said combustion chamber at one side thereof to extend in a front to rear direction, means for conducting flue gases from the opposite side of said combustion chamber upwardly in conductive relation with the hot air flowing upwardly from said heating chamber and over said baking chamber in conductive relation with the air in said baking chamber and to a flue outlet at the same side of said oven as said burner, said burner having a plurality of spaced ports arranged in two longitudinal rows, both of which begin at the front end of the burner but one of which extends rearwardly a greater distance than the other, means for adjusting said burner to vary its effective distance from said roof from front to rear, and means for channeling the flue gases to deter their movement from front to rear as they travel from said combustion chamber to said flue outlet, and means for channeling the air as it travels in said heating chamber and in the two first-named means to deter movement thereof from front to rear.

23. A baking oven comprising a baking chamber, a heating chamber beneath said baking chamber, a dead air chamber interposed between said baking chamber and said heating chamber, means for conducting hot air from said heating chamber upwardly along one side of said baking chamber to the top thereof, means for conducting air from said baking chamber downwardly along the opposite side thereof back to said heating chamber, said two means being so disposed to one another that the air will travel downwardly in said baking chamber from the first-named means to the second-named means, a combustion chamber beneath said heating chamber and having a conductive roof which forms the floor of said heating chamber, a gas burner mounted in said combustion chamber at one side thereof to extend in a front to rear direction, means for conducting flue gases from the opposite side of said combustion chamber upwardly in conductive relation with the hot air flowing upwardly from said heating chamber and over said baking chamber in conductive relation with the air in said baking chamber and to a flue outlet at the same side of said oven as said burner, said burner having a plurality of spaced ports arranged in two longitudinal helical rows, both of which begin at the front end of the burner but one of which extends rearwardly a greater distance than the other, means for adjusting said burner vertically and angularly about its axis, means for channeling the flue gases to deter their movement from front to rear as they travel from said combustion chamber to said flue outlet, and means for channeling the air as it travels in said heating chamber and the two first-named means to deter movement thereof from front to rear.

24. A baking oven comprising a baking chamber, a heating chamber beneath said baking chamber, means for conducting hot air from said heating chamber upwardly along one side of said baking chamber to the top thereof, means for conducting air from said baking chamber downwardly along the opposite side thereof back to said heating chamber, said two means being so disposed relative to one another and to said heating and baking chambers that the air will travel downwardly in said baking chamber from the first-named means to the second-named means, a combustion chamber beneath said heating chamber and having a conductive roof which forms the floor of said heating chamber, a main gas burner mounted in said combustion chamber at one side thereof to extend in a front to rear direction, a chamber insulated from the baking and heating chambers but open at its bottom and rear for admission of atmospheric air and communicating with said combustion chamber to supply the combustion air, and a pilot burner and controls for the same and for said main burner mounted in said last-named chamber, said flue outlet being also mounted in said last-named chamber at the top thereof and communicating therewith so that air from said last-named chamber is sucked up by the gases rising in said flue outlet to cool said controls and to act as a brake on the velocity of said flue gases.

25. A baking oven comprising a baking chamber, a heating chamber beneath said baking chamber, a combustion chamber beneath said heating chamber, a gas burner mounted in said combustion chamber, a chamber disposed at one side of said oven but insulated from the baking and heating chambers, the last-named chamber having openings for admitting atmospheric air to it and for supplying atmospheric air to said combustion chamber, a flue exit for the combustion chamber mounted in said last-named chamber and communicating therewith for venting combustion gases and a portion of the entering atmospheric air whereby the velocity of the vented combustion gases is reduced, a vent duct for the baking chamber mounted in said last-named chamber, and controls for the gas burner mounted in said last-named chamber.

26. A baking oven comprising a baking chamber, a heating chamber beneath said baking chamber, a combustion chamber beneath said heating chamber, a main gas burner mounted in said combustion chamber at one side thereof to extend in a direction from front to rear of said oven, a chamber at the same side of said oven as said burner but insulated from said heating and baking chambers, said last-named chamber being open at its bottom and at its rear for admission of atmospheric air thereto and opening along its whole length from front to rear into said combustion chamber to supply air for combustion to said main burner.

27. A baking oven comprising a baking chamber, a heating chamber beneath said baking chamber, a combustion chamber beneath said heating chamber, a main gas burner mounted in said combustion chamber at one side thereof to extend in a direction from front to rear of said oven, a chamber at the same side of said oven as said burner but insulated from said heating and baking chambers, said last-named chamber being open at its bottom and at its rear for admission of atmospheric air thereto and opening along its whole length from front to rear into said combustion chamber to supply air for combustion to said main burner, and a pilot burner mounted in said combustion chamber with its tip only extending into operative relation to said main burner but rearwardly of the front end of said main burner whereby said main burner may be removed from said combustion chamber by sliding it axially forward without disturbing said pilot burner.

28. A baking oven as claimed in claim 26 having an air inspirator for the main burner, a passageway connecting said last-named chamber and said combustion chamber, said air inspirator being located in said passageway to remove it from the heat zone and to insure fresh air for the inspirator.

References Cited in the file of this patent
UNITED STATES PATENTS

| | | |
|---|---|---|
| 601,586 | Petersen | Mar. 29, 1898 |
| 635,075 | Newhs | Oct. 17, 1899 |
| 919,654 | Uhtbrock | Apr. 27, 1909 |
| 1,083,908 | Andre | Jan. 13, 1914 |
| 1,857,447 | Engels | May 10, 1932 |
| 1,950,670 | Gleason | Mar. 13, 1934 |
| 1,974,680 | Mackintosh | Sept. 25, 1934 |
| 2,122,397 | Gantvoort | July 5, 1938 |
| 2,139,448 | Gantvoort | Dec. 6, 1938 |
| 2,167,616 | Willis | July 29, 1939 |
| 2,236,673 | Cole | Apr. 1, 1941 |
| 2,237,720 | Waddell | Apr. 8, 1941 |
| 2,269,157 | Levine | Jan. 6, 1942 |
| 2,531,824 | Paille | Nov. 28, 1950 |
| 2,605,091 | Socke | July 29, 1952 |